Dec. 6, 1927.    1,651,618
A. E. MOULD
VEHICLE SIGNAL
Filed March 16, 1927
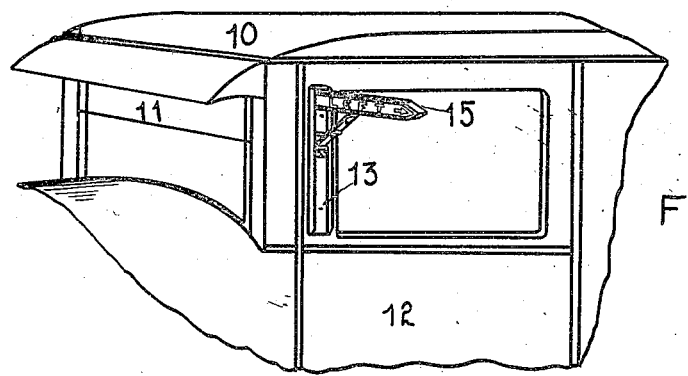
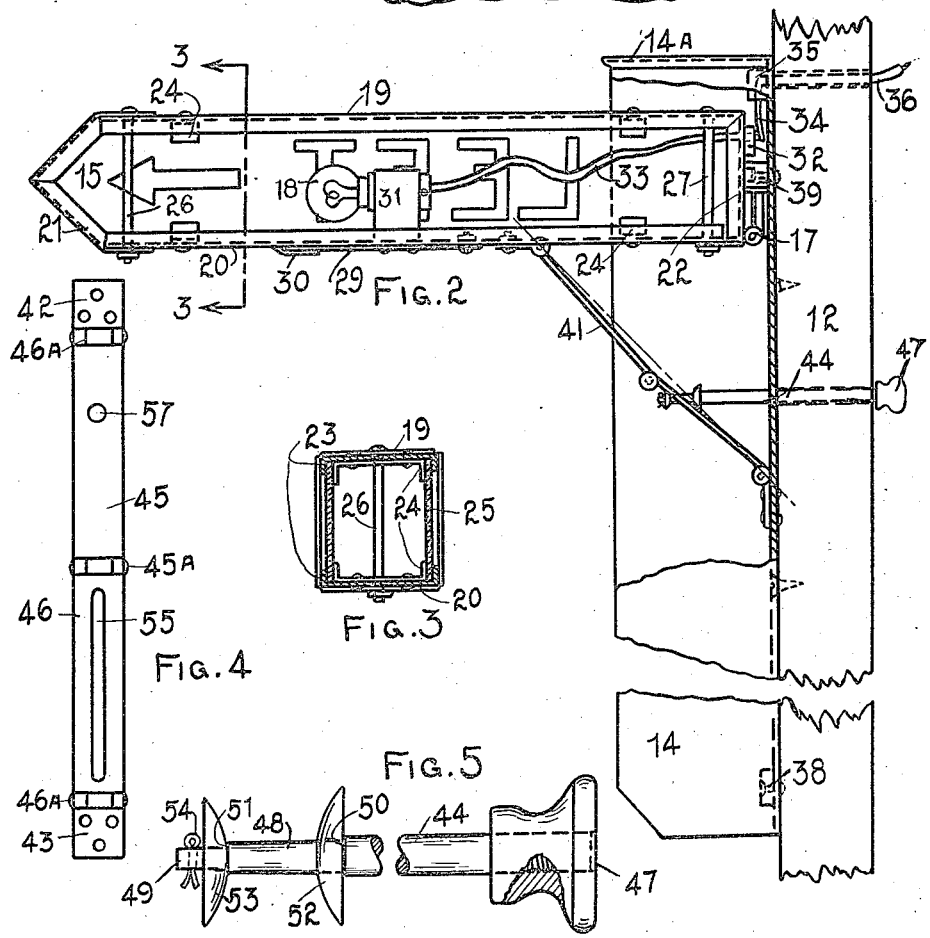
INVENTOR:—
A. E. Mould,
BY
E. J. Featherstonhaugh Patented Dec. 6, 1927.

1,651,618

UNITED STATES PATENT OFFICE.

ALBERT ERNEST MOULD, OF TORONTO, ONTARIO, CANADA.

VEHICLE SIGNAL.

Application filed March 16, 1927. Serial No. 175,837.

This invention relates to a vehicle signal, as described in the present specification and illustrated in the accompanying drawings which form part of the same.

The invention consists essentially of the novel features pointed out broadly and specifically in the claims for novelty following a description containing an explanation in detail of an acceptable form of the invention.

The objects of the invention are to build a signal of very simple and substantial construction, easy to operate, and designed to be made into a small device; to provide a housing within which the signalling member is hidden when not in operation; and generally, to supply an inexpensive and improved signal capable of accomplishing the aforesaid purposes.

In the drawings, Figure 1 is a fragmentary perspective view of a closed automobile equipped with a signal built in accordance with this invention;

Figure 2 is a side elevation view of the device, the front glass pane being removed to expose the inside of the signalling arm;

Figure 3 is an end view taken on line 3—3 in Figure 2;

Figure 4 is a bottom plan view of the hinge;

Figure 5 is a fragmentary side elevation view of the operating rod, portions being shown in section.

Like numerals of reference indicate corresponding parts in the various figures.

Referring to the drawings, 10 designates a closed automobile having the windshield 11 and door 12, and 13 designates the device complete as mounted upon the automobile.

The device is mounted vertically on the left hand side of the automobile and preferably on the front stile of the door, as shown in Figure 1; the device is thus in proximity to the driver who operates same with his left hand. When the driver wishes to make a left-hand turn, he raises the signalling member and therefore gives notice to the drivers of the vehicles following his as well as of the oncoming ones, of his intention of making the turn.

The device is mostly intended to be used on the left-hand side of a vehicle, since in countries where the traffic proceeds on the right-hand side of the road, accidents occur, not when a right-hand turn is effected but when a left-hand turn is attempted; the device, however, could also be used on the right hand side of a vehicle.

14 is a U-shaped casing or housing having the top wall 14$^A$ and sized to enclose and substantially hide the signalling member or arm 15 when in its closed position; the casing is suitably secured to the front stile of the door 12. The signaling arm is made of an all-metal hollow or box construction so as to enclose the electric bulb 18, and is pivotally mounted upon the housing 14 by means of suitable hinges 17. The arm is formed of the top wall 19, the bottom wall 20, the front wall 21, and rear wall 22 which is preferably integral with the wall 19. Each of the walls is made to a shallow U-section to provide flanges 23 forming with the metal cleats 24, means of retaining the glass panes 25 in an upright position within the arm. 26 are bolts engaging the top, bottom and front walls, and 27 are bolts engaging the top, bottom and rear walls, these bolts forming means of retaining the glass panes and walls in their assembled position.

A suitable opening or aperture is provided in the bottom wall 20, which is closed by the removable lid 29. The lid is secured to the arm by inserting one end between the wall 20 and the lug 30, and bolting the other end to said wall. The bulb 18 is removably carried in the clamp or bracket 31 secured to the lid 29; by removing the lid, easy access is gained to the bulb. The bulb is connected to a suitable terminal 32 by means of a wire 33; 34 is a spring contact carried by the insulated bracket 35, and 36 is a wire leading to the ammeter used on the vehicle. The spring contact 34 is positioned and formed to be engaged by the terminal 32 when the signalling arm has reached a substantially horizontal position.

When the device is mounted upon an automobile having a wood structure, the bracket 31 must be suitably grounded so as to complete the electric circuit; but since the device is made of metal, the bracket 31 is sufficiently grounded when the device is mounted upon an automobile having a steel body.

Suitable rubber washers 38 and 39 are provided in the housing 14 to form cushions destroying the momentum of the arm 15 when raised or lowered.

41 is a hinge made of the hinge straps or members 45 and 46 pivotally connected together by the hinge pin 45^A and of the hinge butts or brackets 42 and 43 pivotally connected to the members 45 and 46, respectively, by the hinge pins 46^A. The butts 42 and 43 are suitably secured to the signalling arm 15 and to the housing 14, respectively. 44 is a push rod or operating rod slidably mounted in the door stile and lying in a substantially horizontal position; the push rod is formed substantially as shown in Figure 5, having one end threaded to receive a button or knob 47, and having the other end reduced at 48 and 49 to provide the shoulders 50 and 51. 52 and 53 are washers loosely mounted on the reduced portions 48 and 49, respectively, the washer 53 being retained in position by means of a cotter pin 54.

The hinge strap 46 is slotted at 55 to receive the reduced portion 48 of the push rod, so that any action of the push rod, in and out, will cause the strap 46 to be correspondingly swung in and out. It is clear that the washers must be made large enough not to be forced through the slot 55; and since the washers ride upon the strap when the push rod is pulled or pushed, the faces of the washers engaging the strap are preferably made spherical.

Any motion of the push rod therefore, will cause the signalling arm to swing. The knob 47 must be adjusted on the push rod to give the rod and the washer sufficient throw to fully raise the signalling arm and to cause the hinge straps to open until the pin 45^A lies past a straight line drawn between the pins 46^A, as illustrated in Figure 2. The knob, by bearing against the inside face of the door stile, then limits the outward position of the hinge straps. The strap 45 is slotted at 57 to provide clearance for the cotter 54 and washer 53 when the signalling arm is in its lowered position within the housing.

Operation: When approaching a cross roads or street into which the driver desires to enter by a left hand turn, he pushes the rod 44 outwardly until the knob 47 bears against the inside face of the door stile. The outward motion of the rod forces the hinge strap 46 to swing outwardly around its hinge pin 46^A, forcing at the same time the signalling arm to swing outwardly and upwardly. The electric circuit is now made and the bulb lighted. After the turn is effected, the rod is pulled inwardly a short distance, after which the weight of the signalling arm forces the hinge straps inwardly until they fold one upon the other.

What I claim is:

1. In a vehicle signal, a signalling arm, a mounting hingingly supporting said arm and adapted to be secured to the vehicle, a four-piece hinge secured between said arm and mounting, and a slidable rod co-acting with said hinge adapted to elevate said arm from a vertical to a substantially horizontal position and releasably lock same in the latter position.

2. In a vehicle signal, a hinged signalling arm, a mounting for said arm and adapted to be secured to the vehicle, a four piece hinge secured between said arm and mounting, and a horizontally movable rod co-acting with said hinge adapted for elevating said arm from a vertical to a substantially horizontal position and releasably locking same in the latter position.

3. In combination with a vehicle, a hinged signalling arm adapted to swing between a substantially vertical and a substantially horizontal position, a four-piece hinge secured between said arm and the vehicle, and a slidable rod horizontally carried by the vehicle co-acting with said hinge and adapted to elevate said arm from the vertical to the horizontal position and releasably locking same in the latter position.

4. In combination with a vehicle, a signalling arm, a mounting secured to the vehicle and hingingly supporting said arm, a four-piece hinge secured between said arm and mounting, and a rod slidably carried by the vehicle co-acting with said hinge and adapted to elevate said arm from a vertical to a substantially horizontal position and releasably locking same in the latter position.

5. In combination with a vehicle, a signalling arm adapted to swing between a substantially vertical and a substantially horizontal position, a mounting for said arm secured to the body of said vehicle, a four-piece hinge secured between the underface of said arm and said mounting, a rod horizontally slidable through said body, co-acting means in said rod and hinge adapted to elevate said arm when said rod is pushed outwardly, and means adjustably carried by said rod adapted to check the outward movement of said rod when the arm is in its horizontal position.

6. In a vehicle signal, a hinged signalling arm adapted to swing between a substantially vertical and a substantially horizontal position, a mounting for said arm and adapted to be secured to the body of the vehicle, a four-piece hinge secured between the underside of said arm and said mounting and having a slot in one of the intermediate pieces, a rod horizontally movable in the body of said vehicle and having the outer end formed to slidably engage with said slot, and a knob adjustably carried on the inner end of said rod forming means of limiting the outward movement of said rod.

Signed at the city of Toronto, this 10th day of March, 1927.

ALBERT ERNEST MOULD.